United States Patent [19]

Mikawa et al.

[11] Patent Number: 4,593,632

[45] Date of Patent: Jun. 10, 1986

[54] TRANSPLANTER PROVIDED WITH SEEDLINGS SELECTOR

[75] Inventors: Isao Mikawa; Masahiro Endoh; Masayuki Kaji; Yoshitaka Kishida; Nobuhiro Yamamoto, all of Takikawa, Japan

[73] Assignee: Circle Iron Work Co., Ltd., Hokkaido, Japan

[21] Appl. No.: 635,585

[22] Filed: Jul. 30, 1984

[30] Foreign Application Priority Data

Jul. 29, 1983 [JP] Japan .......................... 58-117319[U]

[51] Int. Cl.$^4$ ............................................. A01C 11/02
[52] U.S. Cl. ........................................................ 111/3
[58] Field of Search ..................... 111/2, 3; 198/460; 47/73, 77, 57.6, 56

[56] References Cited

U.S. PATENT DOCUMENTS

| | | | |
|---|---|---|---|
| 4,167,911 | 9/1979 | Masuda et al. | 111/3 |
| 4,215,513 | 8/1980 | Dedolf | 111/2 X |
| 4,289,080 | 9/1981 | Penley | 111/3 |
| 4,341,333 | 7/1982 | Boa et al. | 111/2 X |

Primary Examiner—Robert A. Hafer
Assistant Examiner—Danton DeMille
Attorney, Agent, or Firm—Oblon, Fisher, Spivak, McClelland & Maier

[57] ABSTRACT

This invention relates to a transplanter of seedlings useful for supplying seedlings in a controlled state. Seedlings grown in paper tubes which are a mixture of superior and inferior seedlings are placed on a seedling supplying conveyor and separated into individuals at a certain interval by a seedling separating apparatus at the terminal of the conveyor. Behind the seedlings separating apparatus is a string-like belt to support roots and leaves, to which is supplied seedlings obtained by separation. Inferior seedlings free of leaves fall onto the string-like belt to transfer only superior seedlings. Behind the string-like belt is a seedling controlling conveyor rotating at a certain velocity, to which seedlings are transferred. In the vicinity of the seedling accepting part of the seedling controlling conveyor there is provided a seedling detector and a circuit to control the accumulation of seedlings by rotating the seedling supplying conveyor slower when the seedlings on the seedling conveyor increases or by rotating the seedling supplying conveyor faster when the seedlings decrease, so as to transfer the seedling at a controlled state.

4 Claims, 3 Drawing Figures

TRANSPLANTER PROVIDED WITH SEEDLINGS SELECTOR

BACKGROUND OF THE INVENTION

1. Field of the Invention

This invention relates to a transplanter capable of transplanting seedlings without error by automatically selecting the seedlings grown in paper tubes to be transplanted and supplying only the superior seedlings selected to the seedling planting element of the transplanter.

2. Description of the Prior Art

Seedlings grown in paper tubes are widely used for planting in the field, for which many suitable transplanters have been developed. Seedlings in paper tubes are prepared by filling soil into the individual tubes of a honeycomb arrangement of tubes and planting 1 to 3 seeds into the soil which are then grown in a hot bed or cold bed. The seeds, by this cultivation, do not always germinate and sometimes leaf defects occur because of disease and damage from insects, which results in the appearance of some inferior seedlings. Such inferior seedlings, when transplanted to the field results in the missplanting and delayed growth, with a corresponding decreased yield.

It has been known to manually separate the paper tubes before planting, or for an operator to place the seedlings in order on a converyor of the transplanter from which inferior ones are removed by hand. But such a selection procedure is extremely troublesome and requires much time and labor, which results in operator's fatigue and a decreased capacity of the transplanter itself because of the manual labor required.

SUMMARY OF THE INVENTION

The present inventors have made extensive research to develop an effective automatic selecting means. As a result, a selecting apparatus has been developed which includes structure for separating congregated seedlings grown in paper tubes into individual ones, placing them in order onto two narrow belts while supporting leaves and roots of the seedlings, separating the leafless paper tube seedlings deficient in germination and growth by lack of support and transferring only superior seedlings for selection.

The present inventors have attempted to apply this apparatus to a transplanter for supplying superior seedlings to a planting element for planting, but a disadvantage was found in that for this apparatus both the speed at which separate paper tube seedlings are supplied and the speed at which the selected seedlings are accumulated on the conveyor and applied into the planting element are determined according to the average percentage of deficiency of germination, and therefore, either too many or too few seedlings accumulated on the belt, which resulted in an oversupply when an excess amount of seedlings were transferred, or an undersupply when too few seedlings were transferred, together with corresponding missplanting and change of planting intervals.

The present inventors have studied and solved this problem by the provision of an apparatus including a seedling conveyor to transfer to the seedlings supplying element a row of seedlings grown in paper tubes, a seedling separating wheel provided on the transfer terminal for the seedling supplying conveyor, a pair of selecting belts to accept the seedlings from the seedling separating wheel and support the leaves and roots of the seedlings to thereby remove inferior seedlings, and a seedling accumulating conveyor to accept superior seedlings from the selecting belt, thereby placing the seedlings compactly in order. The seedling accumulating conveyor is made to rotate at a certain velocity and the transfer line of the accepting part is provided with a non-contacting type of seedling detector to control the rotation speed of the seedling supplying conveyor and the accumulating belt through an electromagnetic clutch using the detector to detect the seedling quantity.

BRIEF DESCRITPTION OF THE DRAWINGS

DETAILED DESCRIPTION OF THE PREFERRED EMBODIMENT

Figure 1:
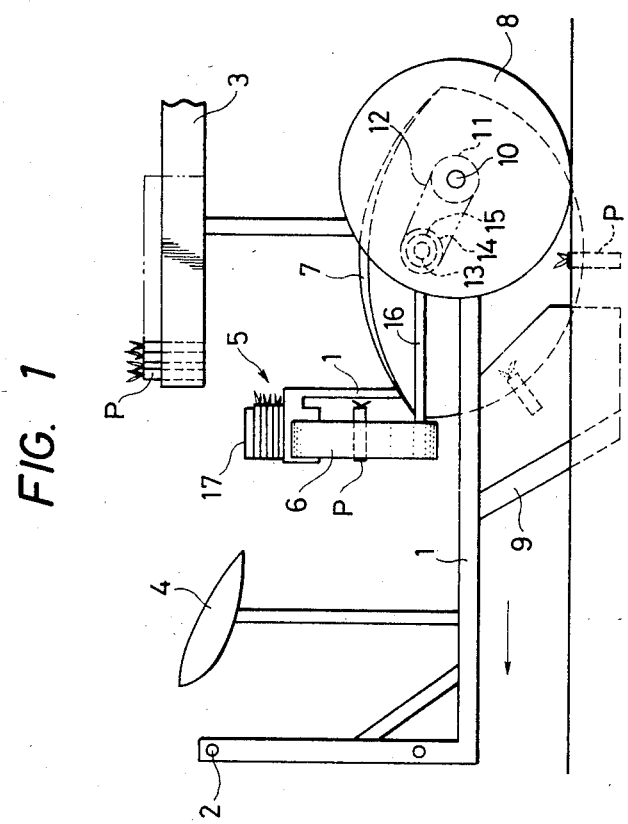
FIG. 1 is a side view of a transplanter equipped with the attachment of this invention.

Frame 1 of the transplanter has, in the front thereof, a setting hole for connecting the transplanter with a tractor to provide motion in the direction shown by the arrow. Above the frame 1 is provided a table for loading seedlings P grown in paper tubes. The bottomless paper tubes with seedlings P are adhered to each other with water-soluble paste to form a honeycomb, the elements of which are easily separated from each other by watering in advance of loading on the table 3. Though paper tube seedlings may vary in germination rate, depending on the kind of plant, the germination rate is usually about 90% for beet seedlings containing at random about 10% inferior seedlings. In the front of the table 3 are a seat 4 and a selective supplying apparatus 5 for the paper tube seedlings. An operator sitting on the seat 4 can move the paper tube seedlings P separated by rows from the table 3 while keeping the roots foreward on the belt 17 of the selective supplying apparatus 5 for the paper tube seedlings and transfer the superior seedlings crosswise while removing the inferior ones. At the transfer (intermediate) edge of the selective supplying apparatus 5 for the paper tube seedlings is provided a pair of vertically moving transfer belts 6. At the lower terminal of the belts 6 are a pair of conventional rotary planting discs 7 which rotate in the direction the machine moves. Therefore, when the head of each of the paper tube seedlings P is tranferred by the transfer belt 6 while projecting therefrom, the pair of rotary planting discs 7 accept the heads of seedlings and rotate downwards to release the seedlings for planting. In the rear of the rotary planting disc 7 there is provided a press disc 8 to provide compaction. Opening plow 9 opens backwards and is provided below the frame 1 and in front of the rotary planting disc 7. The transverse width of the opening plow 9 is adjusted so that it causes the rotary planting disc 7 to release the paper tube seedlings P in the open furrow and permit the seedlings to be compressed with the following press disc 8. The above mentioned elements of the apparatus are respectively driven by means of the rotation of the press disc 8 sprocket wheel 11 which is fixed to a shaft 10 of the press disc 8, which rotates the sprocket wheel 14 secured to shaft 13 of the rotary planting disc 7 by means of chain 12. On the shaft 13 is mounted a bevel gear 15 which rotates a counter shaft 16 for driving the selective supplying apparatus 5 of the paper tube seedlings and the transfer belt 6.

Figure 2:
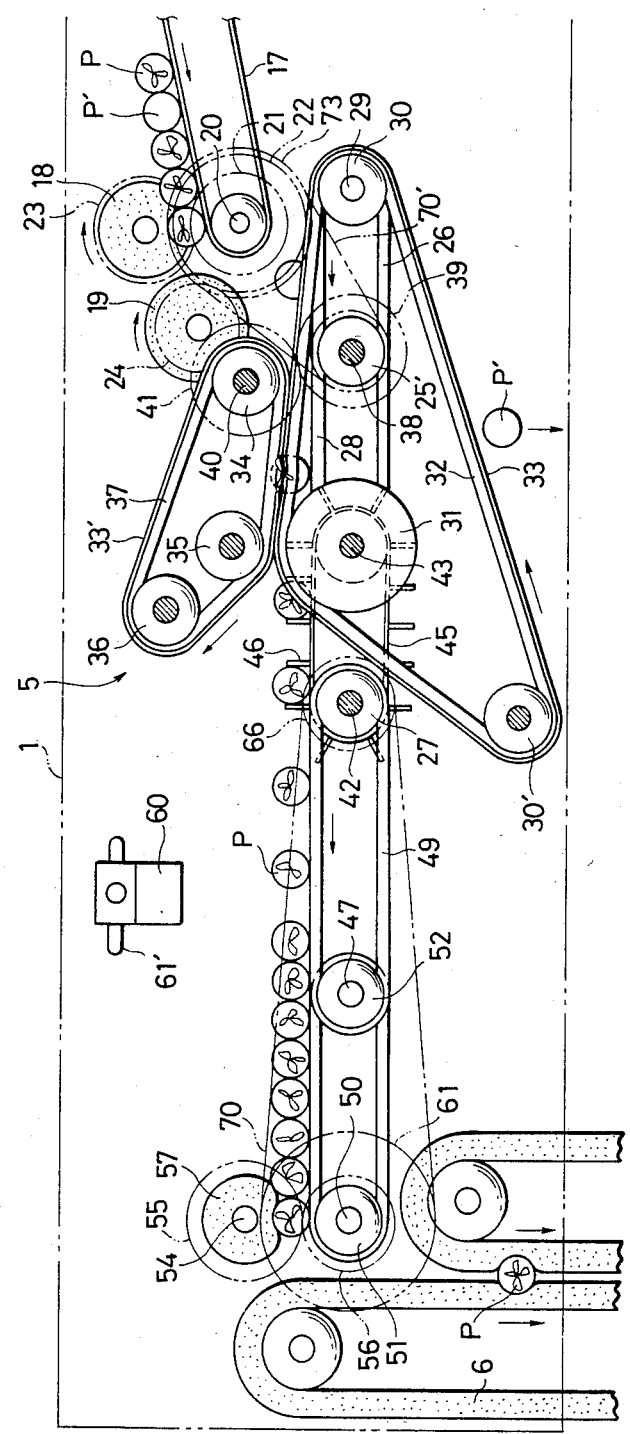
FIG. 2 is a sectional view taken on line A—A of FIG. 3 showing the selective supplying apparatus for paper tube seedlings.
Figure 3:
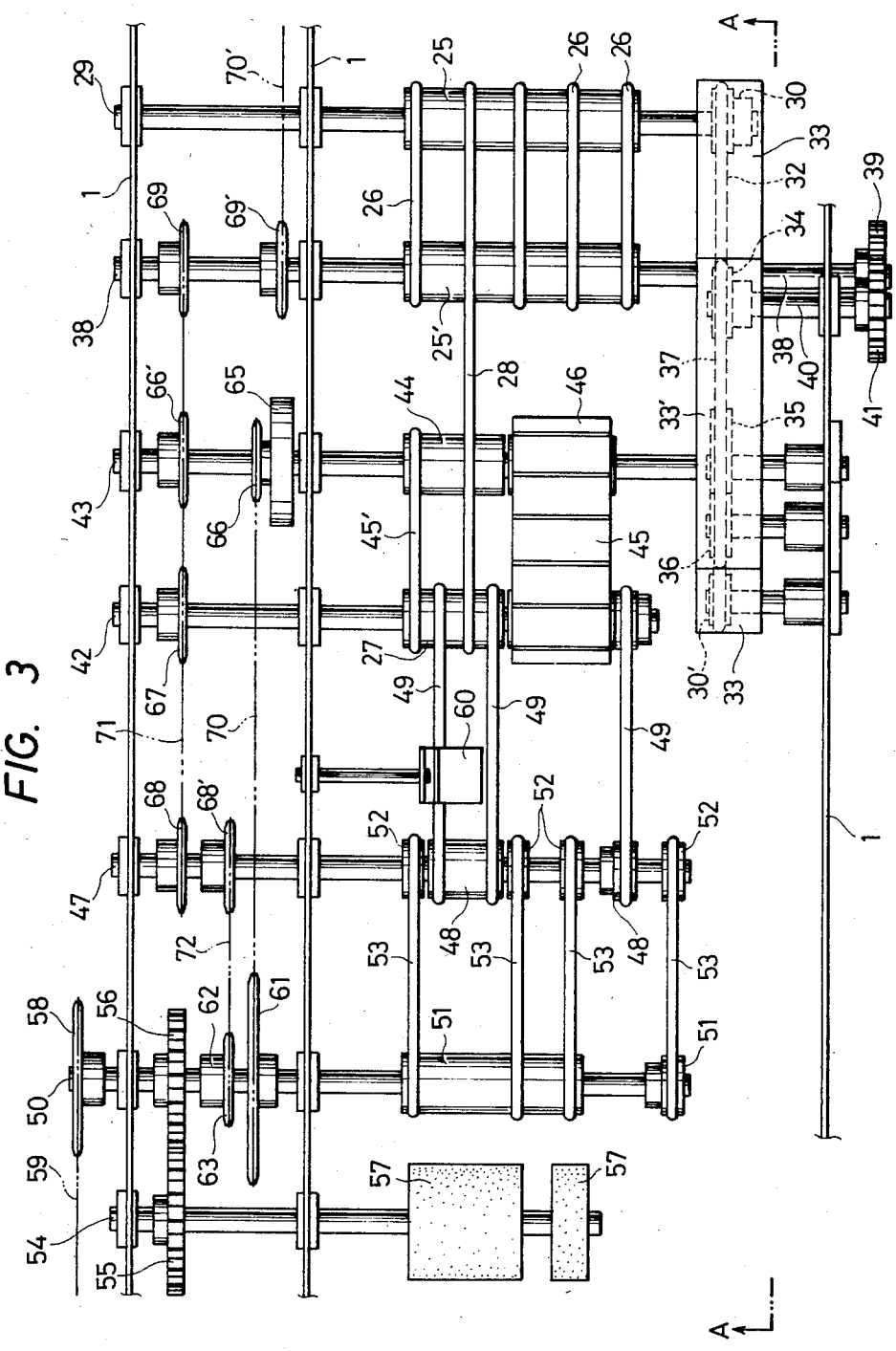
FIG. 3 is a plan view of FIG. 2.

Referring to FIG. 2 and FIG. 3, the selective supplying apparatus 5 according to this invention will now be described in detail.

An operator places on supplying belt 17 the paper tube seedlings which are in contact with each other in a row. The supplying belt 17 is a flat-belt and rotates in the direction shown by the arrow. Above the transfer terminal is provided a spongy press wheel 18 for seedlings, the wheel 18 being spaced from the belt 17 by a distance sufficient to hold the paper tube seedlings P, so that the seedlings P are propelled forward while being pressed. In front of the spongy press wheel 18 is a spongy separator 19 for the seedlings which is rotated rapidly to separate the seedlings in a row of seedlings into individual seedlings. The rotation is effected by fixing gear wheels 21 and 22, which are different in diameter, to the pulley shaft 20 of the supplying blet 17, meshing the gear wheels 21 and 22 with gear wheels 23 and 24 which are fitted on the spongy press wheel 18 and spongy seedlings separator 19 respectively, so that spongy separator 19 may rotate in the direction shown by the arrow.

Below the terminal of the supplying belt 17 is a selector of the selective supplying apparatus 5 which is composed of a conveyor capable of rotating faster than the supplying belt 17 and holding individual paper tube seedling P separated by the spongy seedlings separator, and widening the seedling spacing permit to separation of inferior seedlings, and an accumulating conveyor capable of rotating slower than the above mentioned supplying belt 17 so that it may supply seedlings positioned closely in a row to the belt 6.

For widening the spacing of the seedlings P there are provided a pair of pulleys 25 and 25' below the seedling separator 19. Fast rotating seedling separating belts 26 are provided between pulleys 25 and 25' to accept thereon the dropped seedlings. The seedling separating belts 26 are a series of stringlike belts, which rotate in the direction shown by arrow with a liner velocity about 2 to 4 times as fast as the supplying belt 17. Behind the pulley 25' is a cylindrical pulley 27. Between pulleys 25 and 27 extends a single string-type supporting belt 28 which accepts paper tube seedlings and rotates at the same speed as the seedlings separating belts 26.

At one end of the shaft 29 of the pulley 25 is fixed a pulley 30 which holds a belt which accepts leaves of seedlings. Below the pulley 27 is provided a pulley 30', and between the pulley 27 and the pulley 25' is provided a counter pulley 31. The pulley 30, the pulley 30' and the counter pulley 31 are triangularly arranged and connected by the leaf supporting belt 32 wherein the counter pulley 31 is larger sized than pulley 30 and 30' and is made to be freely rotatable, as is the pulley 30'.

Leaf supporting belt 32 is a string-like belt to the outside of which is fixed a wide belt 33 so that the leaves may be protected from falling onto one of the pulleys. The leaves are held by the belt 33 and a wide belt 33', positioned above and opposite to the belt 33, wherein above the wide belt 33 are three triangularly placed pulleys 34, 35 and 36 belted with a string-like belt 37 the outside of which is connected to the wide belt 33'.

Gear 39 fixed to the end of the shaft 38 of the pulley 25' and gear 41 fixed to the shaft 40 of the pulley 34 mesh with each other to affect pulley drive. The pulleys 35 and 36 are freely rotating and the wide belts 33 and 33' are made to rotate at the same velocity but in the reverse direction to each other.

Therefore, paper tube seedlings P which fall onto the seedlings separating belts 26 are held while their roots are supported on the supporting belt 28 and leaves on the wide belts 33 and 33'. When the seedlings separating belts 26 rotate in the direction shown by the arrow, the leaves of the seedlings are captured at the ends of the belts 26 between the wide belts 33 and 33' and are transferred as a result of the movement belt 33. When the paper tube seedlings P move further ahead, they are moved with their heads raised upward because of the large diameter of the intermediate (counter) pulley 31.

The paper tube seedlings may thus be transferred almost horizontally without lowering the heads of the paper tube seedlings. Inferior seedlings P' having leaves which are deficient or immature fail to be captured, since only their lower roots are held by the supporting belt 28. These seedlings fall from the ends of the seedlings separating belts 26 because of the unbalance caused by the position of the extremely narrow belt 28.

The paper tube seedlings P separated from inferior seedlings P' and consisting only of superior seedlings P are then transferred further and reach the pair of sedlings correcting (arraying) belts 45 and 45' belted between the pulley 27 and the pulley 44 which is fixed to the shaft 43 positioned between the shaft 38 of the pulley 25' and the shaft 42 of the pulley 27. The belts 45 and 45' rotate at the same speed as the belt 28. The string-like belt 45' supports the lower roots of seedlings and the wide belt 45 is capable of supporting the middle of the paper tube seedlings P. The wide belt 45 has a plurality of wings 46 extending parallel to the shaft 43 at an interval sufficient for one seedling P. Therefore, when the seedlings P are transferred by the belts 28, 33 and 33' toward the seedlings arraying belt 45, they are scooped from below by the wings 46 and are captured between the wings. Consequently the seedlings are correctly positioned crossways on the belt 45 and the leaves thereof are no longer held by the leaf-holding belts 33 and 33'.

The seedlings P arrayed on the seedlings arraying belts 45 and 45' are moved onto the string-like controlling belts 49 which are belted between the pulley 27 and the pulley 48 mounted on the shaft 47 behind and parallel to the pulley 27. As the belts 49 are on the same level and rotate at the same speed as that of the belts 28 and 45, the seedlings can be transferred at the same speed as on the belt 28.

Next to the shaft 47 is a driving shaft 50, to the end of which is fixed a sprocket wheel 58 which is linked with the intermediate (counter) shaft 16 through the chain 59. To the driving shaft 50 is fixed a cylindrical pulley 51, and on the shaft 47 are provided freely rotating pulleys 52. The pulley 51 and the free pulleys 52 are belted with string-like accumulating belts 53 so that rotation may be effected by the pulley 51. The belt 53 is adjusted to normally rotate slower than the supplying belt 17 and to have a linear velocity of about $\frac{1}{3}$ to $\frac{1}{4}$ that of the belts 26, 28, 45 and 49. The velocity ratio between belts is determined mainly based on the seedling yield (superior seedlings content %). For example, for the apparatus to be attached to a beet seedling transplanter when the normal velocity of the accumulation belts 53 is 1.0, that of the belts 49, 45, 28 and 26 should be about 3.0 and that of the supplying belt 17 should be about 1.2. The transfer of the seedlings, therefore, becomes slower on the belts 53 so that the paper tube seedlings P on the belts 53 progress while being pushed by the subsequent paper tube seedlings on the belt 49. As a result, the paper tube seedlings become closely contacted.

Above the transfer terminal of the belts 53 is mounted the shaft 54 secured to the gear 55 which is meshed with the gear 56 of the driving shaft 50 so that shafts 50 and 54 rotate reversely to each other. To the shaft 54 is mounted a press wheel 57 which is covered with an elastic material such as sponge and which rotates at the same speed as the belt 53.

A photoelectric switch 60 is fixed to the frame 1 in the vicinity of the belts 53 and above the belts 49. On the frame 1 there is preferably provided a long slot 61' so that the attachment position of the switch 60 may be freely controlled along the slot. The photoelectric switch 60 may be replaced with noncontact detectors of the type which are typically used as detectors of articles. With any detectors an "On delay system" is preferred wherein the second of two sequential detections separated by less than a predetermined time period is ignored. For example, for a paper tube seedlings P of diameter 18 mm moving at a speed 30.6 mm/second on the belt 49, passing under the photoelectric switch 60 requires 0.588 seconds, so it is preferable to adjust the detector to ignore detections separated from a previous detection by less than 0.6 seconds.

In the above structure when inferior seedlings P' have a uniform distribution as grown in the honeycomb like paper tubes, and the seedlings yield accords with the speed ratio between the supplying belt 17 and the belts 53, any variance in the number of seedlings on the belts 53 is minimized because inferior seedlings are left at the terminal of the belts 26, and even if the belts 53 are made short, there are an adequate number of seedlings supplied from the wheel 57 to the belt 6 thereby maintaining a continuous flow of the seedlings for planting by the planting disc 7. However, if inferior seedlings P' have a high distribution so as to constitute a succession of 3 to 5 inferior seedlings, the seedlings P cannot be transferred continuously onto the accumulating belts 53, resulting in interruption of the transfer and misplanting such that a seedlings planting is omitted.

Consequently, according to this invention, for beet seedlings of yield of about 90%, the speed of the seedlings supplying belt 17 is adjusted to be 1.2 times as fast as the speed of belts 53 so that the seedlings P may be constantly kept on the belt 53. When the photoelectric switch 60 detects the accumulation of the seedlings on the belts 49 it controls the belt drive to make the rotation of the belts 49, 28 and 17 slower while keeping the normal speed of the belts 53.

The variation of the speeds of the belts 17, 25, 28, 45 and 49 is accomplished as follows. The driving shaft 50 is provided with a large sprocket wheel 61 fixed to the shaft and a small sprocket wheel 63 which is mounted to the shaft 50 via a one way ratchet 62. The large sprocket wheel 61, in the normal condition, rotates the sprocket wheel 66 through the chain 70. The sprocket wheel 66 is mounted on the shaft 43 via the electromagnetic clutch 62 so that rotation of the sprocket wheel 62 also rapidly rotates the shaft 43 through the electromagnetic clutch 65.

The small sprocket wheel 63 is driven so as to rotate as fast as the shaft 50 or a bit faster. To the shaft 43 is fixed the sprocket wheel 66' which rotates at the same speed as the sprocket wheel 69 fixed to the shaft 38 and the sprocket wheel 67 fixed to the shaft 42, wherein the sprocket wheel 67 and the sprocket wheel 68 of the shaft 47 are chained with the chain 71. To the shaft 47 is also provided a sprocket wheel 68' which is chained by means of chain 72 to the sprocket wheel 63 to drive the wheel 63 at a speed at least that of the shaft 50. To the shaft 38 is fixed a sprocket wheel 69' which is chained by means of chain 70' to the sprocket wheel 73 of the shaft 20 to effect the transferring speed of the seedling supplying belt 17 to be 1.2 times as fast as the belt 53. The small sprocket wheel 63 rotates with the large sprocket wheel 61, but the wheel 63 can slip in one direction because of the existence of the ratchet 62 as long as it is driven at least as fast as the shaft 50.

In this mechanism, the successive transferring from the seedling supplying belt 17 only of superior seedlings increases the accumulation of the seedlings on the belt 53 followed by their accumulation on the belt 49, which the photoelectric switch 60 detects. Upon such detection, the switch 60, through known control means (not shown), causes the electromagnetic clutch 65 to be deactivated. As a result, the drive of the large sprocket wheel is interrupted and the rotation speed of the shaft 43 decreases to less than that of the rotation of the driving shaft 50. As a result, the small sprocket wheel 63 is put in motion by the action of the ratchet 62. The small sprocket wheel 63 is now directly driven by the shaft 50 and the rachet 62 at a lower speed than previously and the speed of the belts 28 and 49 are only a bit faster than the belt 53 while the supplying speed of the belt 17 is adjusted to be about 0.4 times that of the belt 53. Consequently, the supply of seedlings is slowed. When the photoelectric switch 60 no longer detects seedlings the electromagnetic clutch 65 is turned "on" to return to rapid transferring.

Any type of transplanter may be affixed to the seedlings selectively supplying apparatus 5 according to this invention; the supplying belt 17 is made faster than the seedling yield, so even if there happens a succession of 3 to 5 inferior seedlings P', the seedlings are kept constantly in a compact situation on the belt 53 and supplied in a stable condition onto a planting element. Selection by hand as in a conventional transplanter is not required, which enables one to plant with a high speed, and which does not bring about improper planting.

The apparatus according to this invention has such advantages that it can be used for several kinds of field seedlings other than the mentioned paper tube seedlings. It is applied to beet, vegetable and tobacco seedlings and to other general crops in the field.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A transplanter having a planting disc and a seedling selector, said seedling selector comprising:
   a supplying conveyor upon which a row of paper tube seedlings may be placed;
   a transfer means for transferring such seedlings to said planting disc;
   selecting and arraying conveyor means positioned for receiving seedlings from said supplying conveyor, and including means for selecting out inferior seedlings, arraying remaining individual seedlings and moving said remaining seedlings towards said transfer means;

controlling conveyor means positioned for receiving individual seedlings from said selecting and arraying conveyor means and moving said seedlings towards said transfer means;

accumulating conveyor means positioned for receiving individual seedlings from said controlling conveyor means, and including means for accumulating said individual seedlings and delivering said individual seedlings to said transfer means;

seedling accumulation detector means associated with said controlling conveyor means for detecting an accumulation of a selecting number of said individual seedlings on said controlling conveyor means;

means for moving said supplying, separating and arraying, controlling and accumulating conveyor means at predetermined speeds; and means responsive to said detector means for slowing said means for moving said supplying conveyor at times only when said accumulation of said selected number is detected by said detector;

whereby an accumulation of said seedlings is not permitted to increase beyond said selected number.

2. The transplanter of claim 1, wherein said detector detects said seedlings without contacting said seedlings.

3. The transplanter of claim 1, wherein said means for moving said supplying, separating and arraying, and controlling conveyor means are driven from said means for moving said accumulating conveyor means via two parallel drive paths, wherein said means for slowing comprise means for selectively driving said supplying, separating and arraying, and controlling conveyor means along a selected one of said two drive paths.

4. The transplanter of claim 3, wherein said two drive paths comprise a high speed drive path and a low speed drive path and wherein said selective driving means comprise an electromagnetic clutch responsive to said detector means in said high speed drive path, and a one way rachet clutch in said low speed drive path.

* * * * *